United States Patent [19]
Pidgeon et al.

[11] 4,012,153
[45] Mar. 15, 1977

[54] STRUCTURAL CONNECTION MEANS

[76] Inventors: Martin J. Pidgeon, 7123 Bellaire Ave., Des Moines, Iowa 50311; Roy E. Green, 8900 Carole Circle, Des Moines, Iowa 50322

[22] Filed: Mar. 21, 1975

[21] Appl. No.: 560,774

[52] U.S. Cl. .............................. 403/170; 403/231; 403/296; 52/656
[51] Int. Cl.² ......................................... F16D 1/00
[58] Field of Search ............... 403/231, 10, 7, 170, 403/171, 172, 173, 174, 175, 176, 177, 178, 231, 292, 296; 52/758 H, 758 F, 656

[56] References Cited
UNITED STATES PATENTS

| | | | |
|---|---|---|---|
| 930,805 | 8/1909 | Smith | 403/10 |
| 2,687,230 | 8/1954 | McPherson | 85/32 R X |
| 3,225,807 | 12/1965 | Watkins | 151/7 |
| 3,314,699 | 4/1967 | Taylor | 403/173 |
| 3,864,051 | 2/1975 | Reid | 52/758 H X |
| 3,890,022 | 6/1975 | Moon | 403/171 X |

FOREIGN PATENTS OR APPLICATIONS

| | | | |
|---|---|---|---|
| 1,073,078 | 9/1954 | France | 85/32 R |
| 829,376 | 3/1960 | United Kingdom | 85/32 R |

*Primary Examiner*—Wayne L. Shedd
*Attorney, Agent, or Firm*—Zarley, McKee, Thomte & Voorhees

[57] ABSTRACT

A structural connection means comprising a block structure having a plurality of outer faces and a hollow interior compartment. An aperature is provided in each of the faces and communicates with the hollow interior. A recessed portion is provided at the outer end of each aperature and is in communication with each of the faces. The recesses are adapted to receive a closure plug. Each of the aperatures is adapted to receive a threaded stud bolt which is adapted to be connected to structural members to secure the same to the connector block. Modified forms of the block are also disclosed adapted to provided different means for securing the studded thread bolt to the structural member.

10 Claims, 15 Drawing Figures

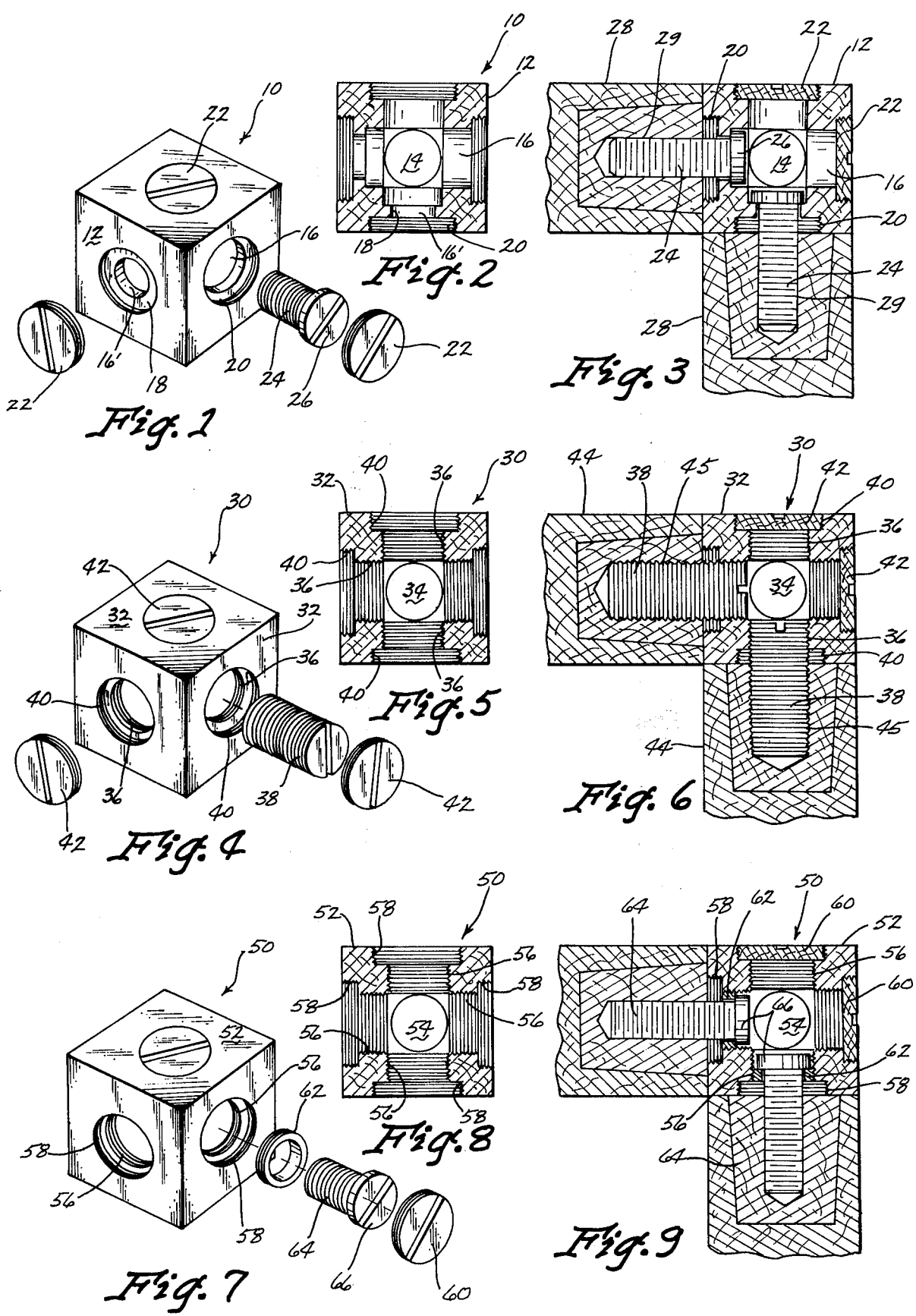

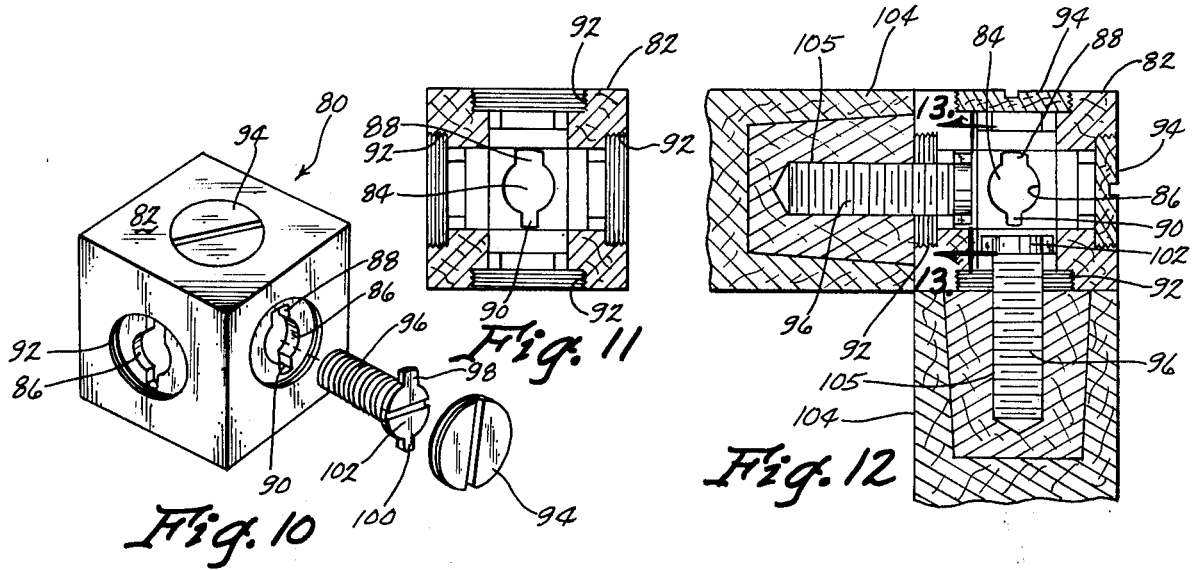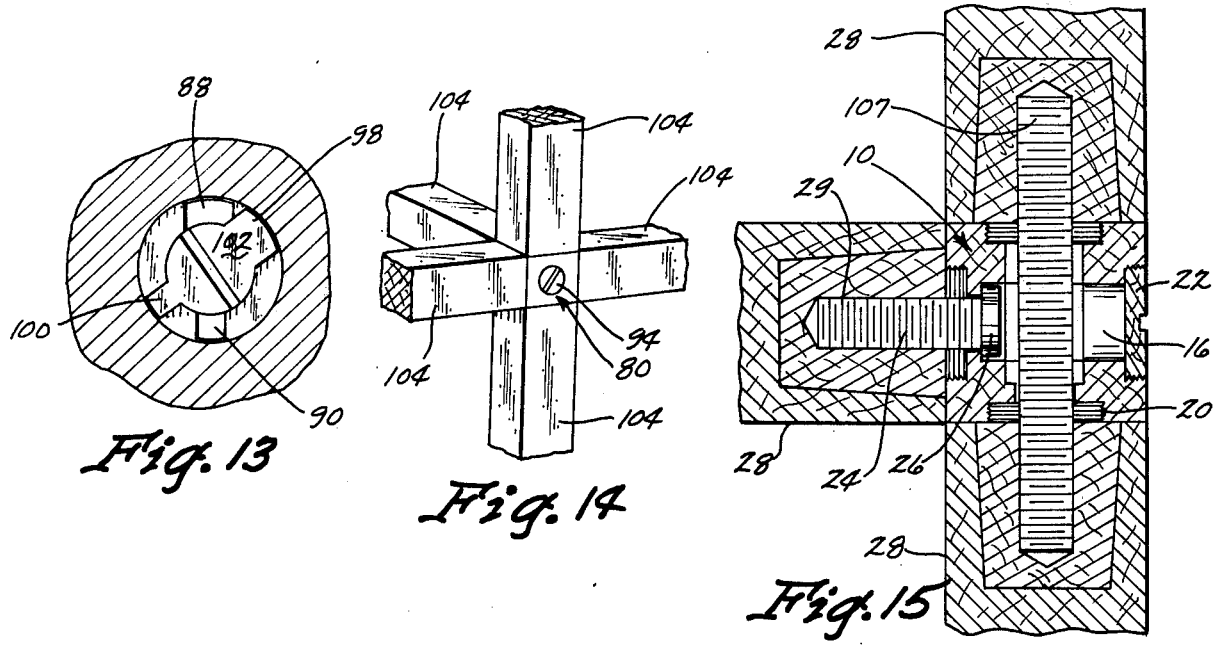

STRUCTURAL CONNECTION MEANS

BACKGROUND OF THE INVENTION

This invention relates to a structural connection means and more particularly to a connector block which permits as many as five structural members to be secured thereto and extending outwardly at right angles therefrom.

Frequently, it is desirable to connect structural members together such as in the furniture art. A problem exists in not only connecting the structural members but in hiding or camouflaging the means for connecting the structural members so as to create an attractive appearance. Heretofore, many attempts had been made to provide a means for connecting structural members but the attempts largely met with failure.

Therefore, it is a principal object of the invention is to provide a structural connection means.

A further object of the invention is to provide a structural connection means which is adapted to have a plurality of structural members connected thereto.

A further object of the invention is to provide a structural connection means including means for shielding or camouflaging the threaded stud bolts employed therein.

A still further object of the invention is to provide a structural connection means which is versatile.

A further object of the invention is to provide a structural connection means which is economical of manufacture, refined in appearance and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a perspective view of the structural connection means:

FIG. 2 is a sectional view of the connection means of FIG. 1:

FIG. 3 is a sectional view similar to FIG. 2 except that a pair of structural members have been secured thereto:

FIG. 4 is a perspective view of a modified form of the invention:

FIG. 5 is a sectional view of the connection means of FIG. 4:

FIG. 6 is a sectional view similar to FIG. 5 except that a pair of structural members are secured thereto:

FIG. 7 is a perspective view of a further modified form of the structural connection means:

FIG. 8 is a sectional view of the connection means of FIG. 7:

FIG. 9 is a sectional view similar to FIG. 8 except that a pair of structural members are secured thereto:

FIG. 10 is a perspective view of another modified view of the invention:

FIG. 11 is a sectional view of the connection means of FIG. 10:

FIG. 12 is a sectional view similar to FIG. 11 except that a pair of structural members are secured thereto:

FIG. 13 is a sectional view seen on lines 13—13 of FIG. 12:

FIG. 14 is a perspective view of a typical assembly; and

FIG. 15 illustrates a continuous bolt extending through the embodiment of FIG. 3.

DESCRIPTION OF THE PREFERRED EMBODIMENTS

With respect to FIGS. 1–3, the numeral 10 refers to a block or block structure having a plurality of outer faces 12. Block 10 is provided with a hollow interior compartment referred to generally by the reference numeral 14. Three aperatures 16 are formed in the faces 12 and communicate with the compartment 14. Three aperatures 16' are also formed in the faces 12 and communicate with the compartment 14. As seen in the drawings, the aperatures 16 have larger diameters than the aperatures 16'. In other words, a large aperature 16 is "in-line" with a small aperature 16'. Aperatures 16' are provided with annular shoulders 18 as illustrated in FIG. 2. A threaded recess 20 is formed in each of the faces 12 and communicates with the aperatures 16 and 16'. The recesses 20 are adapted to threadably receive a closure plug 22 therein. The numeral 24 refers to threaded stud bolts having enlarged head portions 26. For purposes of description, the numeral 28 refers to structural members or components which may be secured to the block 10 as required or desired.

To connect the components 28 to the block 10 it is first necessary to remove certain of the closure plugs 22, assuming that the plugs have been previously installed. A stud bolt 24 is inserted through one of the aperatures 16, into the interior compartment 14 and outwardly through the aligned aperature 16'. The stud bolt 24 is threadably secured to or received by the interior threads 29 of the component 28. The annular shoulder 18 limits the movement of the bolt 26 and causes the member 28 to be securely drawn against the associated outer face 12 upon the stud bolt 26 being threadably rotated. Additional members 28 may also be secured to the block 10 in the manner just described. When the unit has been assembled in the desired fashion, the closure plugs 22 are installed in the exposed recesses 20 to camouflage the stud bolts, etc.

If it is necessary to repair, tighten or otherwise modify the assembled components, the appropriate closure plug or plugs 22 may be removed to gain access to the heads of the stud bolts.

In FIGS. 4–6, the numeral 30 refers to a block or block structure having a plurality of outer faces 32. Block 30 is provided with a hollow interior compartment 34. Aperatures 36 are provided in the faces 32 which communicate with the compartment 34. The aperatures 36 are threaded for threadably receiving the stud bolts 38 as will be described in greater detail hereinafter. Threaded recesses 40 are formed in each of the faces 32 and communicate with the aperatures 36. The numeral 42 refers to closure plugs which may be threadably fitted into the recesses 40. For illustration purposes, the numeral 44 refers to structural members or components which may be fastened to the block 30.

The components are assembled much like that described in the embodiment of FIGS. 1–3, The essential difference is that the stud bolts 38 do not have enlarged head portions. Thus, the interior threads 45 of the components 44 must be such that the end of the stud bolt 45 can engage the end of the threads to draw the component tightly against the face of the block 30. In other words, if the length of the internally threaded portion 45 had a length greater than the length of the stud bolt 38, threadable rotation of the stud bolt 38 relative to member 44 would simply cause the bolt 38 to be threaded out of the aperature 36 and into the threaded portion 45 without securing the component 44 to the block.

With respect to FIGS. 7–9, a block or block structure 50 is provided with outer faces 52 and an interior compartment 54. Threaded aperatures 56 are formed in each of the faces 52 and communicate with compartment 54. Threaded recesses 58 are provided in the faces 52 and communicate with aperatures 56. Closure plugs 60 are adapted to be threadably received by the recesses 58. Externally threaded collars 62 may be threadably mounted in the aperatures 56 as seen in FIG. 9. Each of the collars 62 has an inside diameter sufficient to receive the stud bolt 64 while having a diameter less than the head 66 of the bolt 64. Structural members or components 68 may be secured to the block 50 as seen in FIG. 9 and as explained in greater detail hereinafter.

The embodiment of FIGS. 7–9 is assembled much like the embodiment of FIG. 1. The primary difference is that the collars 62 must first be threaded into the appropriate aperatures 56. With the collar 62 in position, the head 66 of the bolt 64 engages the collar 62 to limit the movement of the bolt 64. Thus, collar 62 serves the same function as the shoulder 18 in block 10.

FIGS. 10–13 illustrate a still further modified form of the invention wherein a block or block structure 80 is provided with a plurality of outer faces 82 and a hollow interior compartment 84. Aperatures 86 are formed in each of the faces 82 and have key-ways 88 and 90 extending outwardly therefrom. As seen in FIG. 13, the key-way 88 is larger than the key-way 90. Threaded recesses 92 are provided in the faces 82 for receiving the closure plugs 94. The aperatures 86 are adapted to receive the stud bolts 96 having tabs or ears 98 and 100 provided on the heads 102 thereof.

The components 104 may be secured to the block so as to extend therefrom in as many as five directions. With the closure plugs 94 initially removed, one of the bolts 96 is extended inwardly through an aperature 86. To insert the bolt into the block 80, it is necessary to align the tabs 98 and 100 with the key-ways or slots 88 and 90 respectively. The shank portion of the bolt 96 is then extended outwardly through the "aligned" aperature 86 so that the bolt 96 can be threadably received by the internal threads 105 of the component 104. The bolt 96 is threadably rotated until the component 104 is drawn tightly against the face 82 of the block 80. The tabs 98 and 100 engage the block adjacent the aperature 86 to limit the movement of the bolt 86. Thus, the tabs 98 and 100 could only possibly move through the key-ways 88 and 90 respectively once in a 360° rotation of the bolt. The length of the threads 105 is controlled to cause component 104 to be drawn tightly against the face 82 when the tabs 98 and 100 are not registering with key-ways 88 and 90.

FIG. 14 simply illustrates a typical assembly wherein five structural components 104 are secured to the block 80. The remaining recess 92 is closed with the closure plug 94 to camouflage the stud bolts or connection means.

FIG. 15 is a sectional view which illustrates the block 10 of FIGS. 1–3 being used in a somewhat different manner. As illustrated in FIG. 15, a continuous bolt 107 is employed and extends through the block 10 to secure a pair of components 28 to opposite sides of the block 10. It should be noted that the component 28 at the left side of the block 10, as viewed in FIG. 15, would be installed prior to the pair of components being connected.

Thus it can be seen that a novel means has been described for connecting structural members while the invention has particular merit in the furniture art, the invention has many features which permit the device to be employed in other areas.

It can be appreciated that as many as five structural components may be secured to a single block structure so as to extend outwardly therefrom in five different directions. The invention is attractive in appearance and hides the connection means through the use of removable closure plugs. The invention not only permits the rapid assembly of structural components but also permits the components to be subsequently serviced, modified, etc. Thus it is apparent that the invention accomplishes at least all of its stated objectives.

We claim:

1. A connector assembly comprising, a block structure having a plurality of outer faces and a hollow interior compartment, each of said outer faces having a threaded aperture formed therein which communicates with said hollow interior compartment, each of said apertures having inner and outer ends, each of said apertures having a recessed portion at the outer end thereof which is in communication with the respective outer face, the inner end of each of said apertures being in communication with said compartment, structural components being positioned in an abutting relationship adjacent at least some of the outer faces of said block structure and having internal threaded portions registering with the said aperture formed in the associated outer face, said structural components having planar surfaces, a threaded stud bolt threadably received by the said aperture and internal threaded portions of said structural components, one end of said stud bolt being positioned in said internal threaded portion, the head portion of said stud bolt being positioned in said interior compartment closely adjacent the inner end of said aperture so that said stud bolts do not interfere with each other, said apertures which receive said stud bolts having means associated therewith for limiting the longitudinal movement of said stud bolt relative thereto so that said structural components may be drawn into rigid abutting engagement with said associated outer face so that the planar surfaces of said structural components are properly aligned with the outer faces of said block structure; said recesses being adapted to receive a closure plug therein.

2. The assembly of claim 1 wherein each of said recesses is threaded for receiving a threaded closure plug.

3. The assembly of claim 1 wherein said block structure has six outer faces, said outer faces having three apertures which have greater diameters than the other three aperatures.

4. The assembly of claim 3 wherein the larger and smaller aperatures are positioned on said faces in an opposing relationship.

5. The assembly of claim 1 wherein all of said apertures are threaded and have identical diameters.

6. The assembly of claim 1 wherein at least some of said outer faces have first and second slots formed therein on opposite sides of said aperture and communicating with said interior compartment, each of said stud bolts comprising a shank portion having a head portion at one end thereof, said head portion having first and second tabs extending outwardly therefrom which are adapted to be received by said first and second slots respectively, 7. The assembly of claim 6 wherein said first and second slots have different widths and wherein said first and second tabs have different widths corresponding to the widths of said first and second slots.

8. The assembly of claim 7 wherein all of said outer faces have the said first and second slots formed therein and wherein said first and second tabs are adapted to engage said block structure at the inner end of said aperature to limit the movement of said stud bolt.

9. The assembly of claim 1 wherein said means for limiting the said longitudinal movement comprising an annular shoulder means extending around said aperture adapted to engage the head portion of the stud bolt.

10. The assembly of claim 1 wherein said means for limiting the said longitudinal movement comprising a threaded collar threadably secured in said aperture.

* * * * *